(12) United States Patent
Poston et al.

(10) Patent No.: US 9,823,876 B2
(45) Date of Patent: Nov. 21, 2017

(54) NONDISRUPTIVE DEVICE REPLACEMENT USING PROGRESSIVE BACKGROUND COPYBACK OPERATION

(71) Applicant: Seagate Technology LLC, Cupertino, CA (US)

(72) Inventors: Lloyd A. Poston, Tracy, CA (US); Gregory Prestas, Ithaca, NY (US); Eugene M. Taranta, II, Casselberry, FL (US)

(73) Assignee: Seagate Technology LLC, Cupertino, CA (US)

( * ) Notice: Subject to any disclaimer, the term of this patent is extended or adjusted under 35 U.S.C. 154(b) by 226 days.

(21) Appl. No.: 14/869,035

(22) Filed: Sep. 29, 2015

(65) Prior Publication Data

US 2017/0090767 A1    Mar. 30, 2017

(51) Int. Cl.
*G06F 3/06*    (2006.01)

(52) U.S. Cl.
CPC ............ *G06F 3/065* (2013.01); *G06F 3/0616* (2013.01); *G06F 3/0689* (2013.01)

(58) Field of Classification Search
CPC .... G06F 3/0647; G06F 3/067; G06F 11/1451; G06F 11/1458; G06F 2201/84; G06F 3/0689; G06F 11/1466; G06F 11/1469; G06F 3/0607; G06F 11/1456; G06F 11/1461; G06F 11/1448; G06F 11/1441; G06F 11/1446; G06F 11/1464; G06F 2201/805; G06F 17/30073; G06F 3/0616; G06F 3/065

USPC ........ 711/162, 112, 114, 161, 100, 154, 168, 711/170
See application file for complete search history.

(56) References Cited

U.S. PATENT DOCUMENTS

| | | |
|---|---|---|
| 6,609,145 B1 | 8/2003 | Thompson et al. |
| 7,721,143 B2 | 5/2010 | Humlicek |
| 7,805,633 B2 | 9/2010 | Sangapu et al. |
| 8,082,390 B1 * | 12/2011 | Fan ..................... G06F 11/1092 711/114 |
| 8,099,623 B1 | 1/2012 | Li et al. |
| 8,135,984 B2 | 3/2012 | Perng |
| 8,417,989 B2 | 4/2013 | Kumar et al. |
| 8,689,040 B2 | 4/2014 | Kidney et al. |
| 8,799,705 B2 | 8/2014 | Hallak et al. |
| 2001/0001870 A1 * | 5/2001 | Ofek .................... G06F 3/0607 711/112 |

(Continued)

*Primary Examiner* — Tuan Thai
*Assistant Examiner* — Edward Waddy, Jr.
(74) *Attorney, Agent, or Firm* — Hall Estill Attorneys at Law

(57) ABSTRACT

Apparatus and method for managing multi-device storage systems. In some embodiments, a distributed data set is stored across a group of storage devices. Data from a selected storage device in the group are reconstructed and stored in a spare location. Host access requests associated with the data are serviced from the spare location along a first data path while the data from the spare location are concurrently transferred along a different, second data path to a replacement storage device maintained in an offline condition using a progressive (iterative) copyback process. The replacement storage device is thereafter transitioned to an online condition responsive to the transfer of the data to the replacement storage device.

20 Claims, 5 Drawing Sheets

(56) References Cited

U.S. PATENT DOCUMENTS

| | | | |
|---|---|---|---|
| 2005/0120267 A1* | 6/2005 | Burton | G06F 11/0793 |
| | | | 714/13 |
| 2008/0091741 A1 | 4/2008 | Zohar et al. | |
| 2008/0126839 A1* | 5/2008 | Sangapu | G06F 11/1092 |
| | | | 714/5.11 |
| 2008/0178040 A1* | 7/2008 | Kobayashi | G06F 11/1088 |
| | | | 714/6.11 |
| 2011/0191637 A1* | 8/2011 | Wight | G06F 11/00 |
| | | | 714/43 |
| 2012/0079317 A1 | 3/2012 | Nelogal et al. | |
| 2012/0096309 A1* | 4/2012 | Kumar | G06F 11/00 |
| | | | 714/6.22 |
| 2013/0198563 A1 | 8/2013 | Govindasamy et al. | |

* cited by examiner

DATA RECONSTRUCTION

NONDISRUPTIVE DEVICE REPLACEMENT USING PROGRESSIVE BACKGROUND COPYBACK OPERATION

SUMMARY

Various embodiments of the present disclosure are directed to an apparatus and method for managing multi-device storage systems.

In some embodiments, a method includes storing a distributed data set across a group of storage devices. Data from a selected storage device in the group is reconstructed and stored in a spare location, which may be a single storage device or spread over multiple storage devices. Host access requests associated with the reconstructed data are serviced from the spare location along a first data path while the data from the spare location are concurrently transferred along a different, second data path to a replacement storage device maintained in an offline condition. A progressive (iterative) copyback process is used to transfer the data from the spare location to the replacement storage device. The replacement storage device is thereafter transitioned to an online condition responsive to the transfer of the data to the replacement storage device.

In other embodiments, a method includes transitioning a selected data storage device from a plurality of data storage devices that collectively store a RAID data set to an offline condition in response to a failure condition associated with the selected data storage device; reconstructing data previously stored on the selected data storage device and storing the reconstructed data in a spare memory location; incorporating a replacement data storage device into the plurality of data storage devices in substitution for the selected storage device, the replacement data storage device in the offline condition; servicing host access requests associated with the RAID data set using the data in the spare memory location along a first data path and concurrently transferring the data along a different second data path to the replacement data storage device in the offline condition using a progressive copyback process; transitioning the replacement data storage device from the offline condition to an online condition responsive to the replacement data storage device receiving a complete set of the replacement data transferred from the spare memory location; and servicing host access requests associated with the RAID data set using the replacement data stored by the replacement data storage device.

In other embodiments, an apparatus includes a group of storage devices which store a distributed data set thereacross, and a restoration control circuit. In response to the detection of a failure condition associated with a selected storage device from the group of storage devices, the restoration control circuit operates to place the selected storage device in an offline condition, reconstruct the data from the selected storage device and store the reconstructed data in a spare location, service host access requests associated with the data from the spare location along a first data path while concurrently transferring the data from the spare location along a different, second data path to a replacement storage device maintained in an offline condition using a progressive copyback process, and transition the replacement storage device to an online condition responsive to the transfer of the data to the replacement storage device.

DETAILED DESCRIPTION

Figure 1:
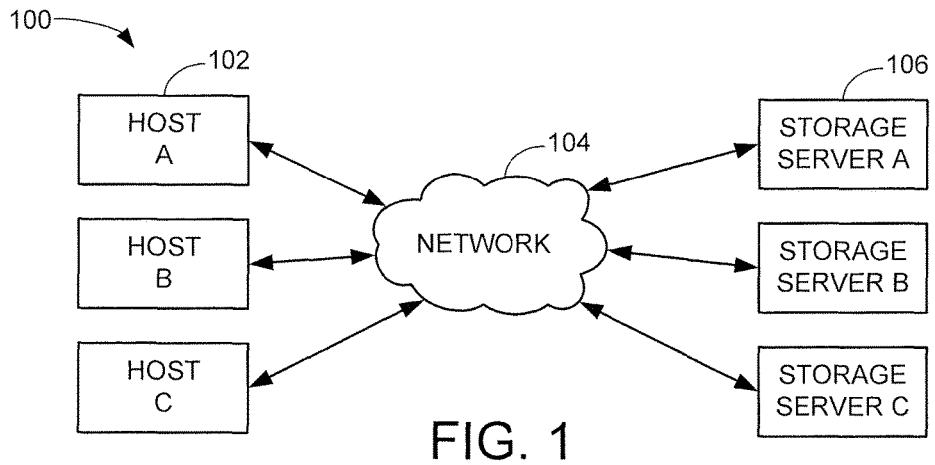
FIG. 1 is a functional block representation of a network-based data storage system in accordance with various embodiments of the present disclosure.

Mass storage systems incorporate multiple data storage devices into a consolidated memory space. Distributed data sets, such as but not limited to RAID (redundant array of independent disks) data sets, can be stored across multiple data storage devices to enhance data integrity and reliability.

Distributed data sets are often configured to be fault tolerant. Should one or more of the devices storing a portion of the data set be removed from service (e.g., "taken offline"), a rebuild process can be used to reconstruct (e.g., recalculate) the data from the missing device to enable the system to continue to make the data set available for host I/O requests. If the device is taken offline because the device experienced a device failure, a new replacement device may be installed in its place to store the reconstructed data.

Rebuild processes of the current art generally involve data reconstruction and system balancing operations. Reconstruction generally involves a background operation whereby the affected device is taken offline and the data previously stored on the offline device is reconstructed using parity or other mechanisms. The reconstructed data are stored in a spare location, such as in a standby available spare storage device or in a distributed spare space provided across multiple existing operational devices.

Rebalancing generally involves a background operation whereby a new, replacement device is brought online and a copyback process transfers the reconstructed data from the spare space to the replacement device. Rebalancing ends when all of the reconstructed data have been successfully transferred to the replacement device and normal system operation resumes.

While operable, these and other rebalance operations of the existing art often suffer from write bottlenecks to the replacement device since both host (client) I/O transfers and copyback I/O transfers are queued to the same device. Some systems assign priority to the servicing of host I/O requests during the copyback period and therefore "throttle" (limit) the copyback rate to a relatively low level, so that most of the available device bandwidth is available to satisfy the host requests. This necessarily extends the copyback period.

In one example, copyback transfers may be limited to a maximum of 10 MB/s (megabytes per second) in order to not significantly affect host I/O access rates. At this rate, it would take about 4.5 days (e.g., about 116 hours) or more to transfer roughly 4 TB (terabytes) of data to a replacement device. Such extended copyback periods present a number of difficulties, including decreased available host I/O access rate as well as the additional processing requirements to track the locations and status of the data in both the replacement device and the spare location.

Because different portions of the data may be located in the replacement device and/or the spare location while the copyback process continues, special purpose metadata (e.g., tracking tables and other data structures) may be continually updated in an effort to ensure that the most current version of the requested data can be accurately located and returned. Servicing host read commands during copyback requires locating and accessing the requested data (e.g., from the replacement device or from the spare location), as well as ensuring that the most current version of the data is being returned.

Servicing host write commands during copyback requires selecting an appropriate target location to write the new data. The updated data associated with host write operations may be transferred directly to the new replacement drive to avoid the need to subsequently transfer the new write data from the spare location. However, for parity reasons it may be necessary to also write the new data to the spare location as well, thus doubling the write workload during the copyback process.

Accordingly, various embodiments of the present disclosure are generally directed to a novel rebuild process for a mass storage system. As explained below, in some embodiments a distributed data set is stored across a group of data storage devices. In response to the failure of a selected one (or more) of the devices, a reconstruction operation is undertaken to reconstruct the data from each failed device in the group. The reconstructed data are stored in a spare location, such as a distributed storage space across multiple operational devices.

A new, replacement device is identified and associated with the group, but remains in an offline state. A progressive (iterative) copyback process iteratively copies the replacement data from the internal spare space to the replacement device. The replacement device remains offline until the data transfer is completed, after which point the replacement device is brought online. In the meantime, host I/O requests are serviced directly from the distributed spare space rather than from the replacement device. The replacement (copyback) data transferred from the spare location to the replacement device generally includes current version reconstructed data from the failed device(s) as well as new data supplied by the host during the reconstruction process.

In this way, host I/O requests do not bottleneck at the replacement device. The host requests are routed directly to the spare space, and are transferred using a different data channel path from the internal data channel path used to transfer the copyback data to the replacement device. Thus, the copyback of data to the replacement device can flow at substantially the full streaming write bandwidth of the replacement device without having any impact on host I/O transfer rates.

Moreover, because the copyback operation is carried out while the replacement device remains in an offline state (e.g., is not available to service host requests), support for failover/failback and power cycling can be reduced since the transfer is not "live" and thus can be restarted or corrected at any time without affecting data integrity. The metadata tracking system complexity can be simplified since the replacement device is not part of the data integrity system, and so the additional overhead required to access and maintain the data on the replacement device at the correct level is unneeded.

An iterative approach is used during the copyback process. Clearly, if no data write updates were experienced during copyback, it would be a relatively simple matter to reconstruct all of the data from the failed device and transfer it as quickly as possible to the new replacement device, followed by transitioning the replacement device to an online state (e.g., available to process host requests). However, it is contemplated that write updates will occur at a particular rate during the copyback process so that new data are written to the spare location, and such will require management to ensure the write updates are ultimately successfully transferred to the replacement device.

Accordingly, some embodiments maintain a metadata structure that indicates the status of the copyback data in the spare space (e.g., both reconstructed data and new data), and what portions of the copyback data have been copied to the replacement device. An elevator mechanism is used so that the copyback data are iteratively transferred while the system continues to service host read and write requests from the distributed spare space. This continues until the rebalance operation is completed and the distributed spare space is synchronized with the replacement device, at which point a switchover occurs and the replacement drive is brought online. So long as the rate at which data write updates occur is lower than the rate at which the reconstructed data are transferred to the replacement device, the time to completion of the copyback operation will necessarily converge to zero.

It has been found that the overall time required to complete the rebalancing operation will depend on the rate at which the host(s) update the data. Generally, a higher rate of updates will extend the copyback period. Nevertheless, it has been found that the disclosed embodiments can reduce the copyback period by a factor of at least 2× (e.g., around 45 hours to complete) up to a factor of around 8× or more (e.g., around 10 hours or so to complete). Regardless of the ultimate length of the copyback period, all ongoing host I/O requests are satisfied by the spare space during this interval using a separate data channel so that host I/O requests are not impacted by the copyback operation.

These and other features and advantages of various embodiments can be understood beginning with a review of FIG. 1 which provides a simplified functional block representation of a distributed data processing system 100. It will be appreciated that the system 100 has been provided merely by way of illustration and is not limiting. The various embodiments presented herein can be adapted to any number of different environments and applications. For purposes of the present example, it is contemplated that the system 100 may be configured as a distributed object cloud computing environment with geographically distributed storage and user resources.

The system 100 includes a number of host devices 102 identified for convenience as Host A, Host B and Host C. These host devices represent user devices of users of the system 100, and may take any number of suitable forms including computers, laptops, workstations, network accessible devices (e.g., tablets, smartphones, etc.).

Any number of host devices 102 can access the system via a network 104. The network can take any suitable form including a wireless network, a local area network LAN), the Internet, etc. Use of a network is contemplated but not required.

Various data storage nodes are established by storage servers 106, identified for convenience as Storage Servers A, B and C. Any number of components may be incorporated into each server 106, including controllers, routers, agents, switches, storage devices, etc. Generally, the system 100 is configured such that a selected user of a selected host device, such as Host A, can issue an I/O request which is routed for servicing by an associated storage node, such as Storage Server B.

Host (client) I/O requests may include write commands in which write data are written to the storage nodes, and read commands in which readback data are retrieved from the storage nodes. For clarity, host I/O requests may originate from the host devices 102 or from elsewhere in the system 100.

Figure 2:
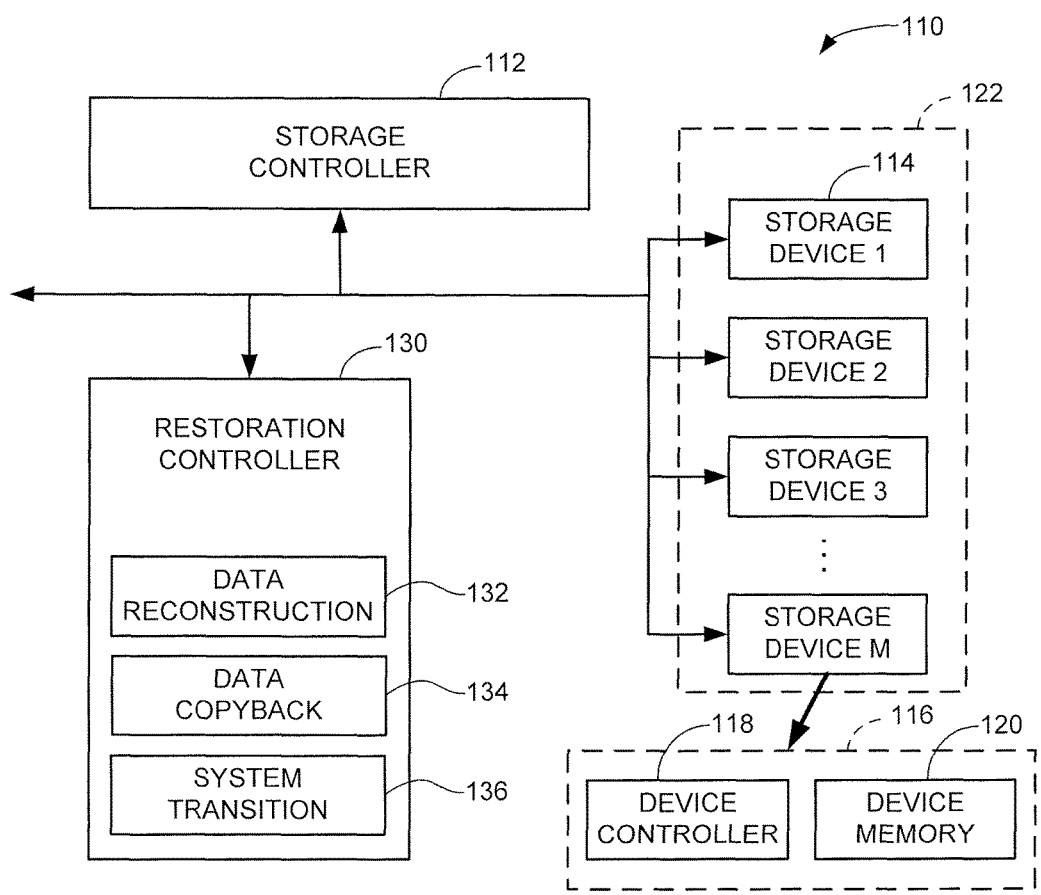
FIG. 2 is a functional block representation of a storage server from FIG. 1 in accordance with some embodiments.

FIG. 2 is a functional block representation of relevant aspects of a multi-device storage system 110. The storage system 110 may form a portion of one of the storage servers 106 from FIG. 1, or may be coupled thereto. The storage system 110 includes a storage controller (control circuit) 112 and a plural number M storage devices 114, which are identified as Storage Devices 1 through M.

The storage controller 112 can take a variety of forms and may include a hardware, software and/or firmware processor which uses programming steps in an associated memory to control the migration of data to and from the storage devices 114.

The storage devices 114 can take any number of suitable forms, including hard disc drives (HDDs), solid-state drives (SSDs), hybrid devices, etc. As shown in FIG. 2, each storage device 114 may be a stand-alone unit with a housing (represented by dashed lines 116) that supports or encloses a local device controller 118 and device memory 120 (e.g., rotatable data recording media, solid-state memory, etc.).

The storage device housing 116 may conform to a selected form factor standard, such as the so-called 3½ inch HDD form factor, the M.2 SSD form factor, etc. In some cases, the M storage devices 114 may be grouped together into a multi-device storage enclosure (represented by dashed lines 122). Multiple storage enclosures 122 may in turn be mounted in a rack, cabinet or other mass storage arrangement. The storage controller 112 and other elements may be incorporated into the enclosure as desired.

Figure 3:
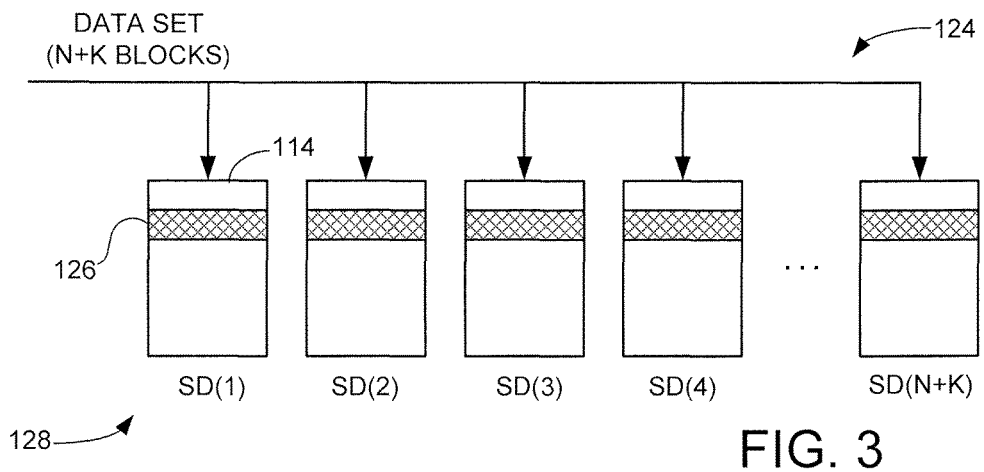
FIG. 3 is a schematic representation of the storage of a distributed data set by the storage server of FIG. 2 in some embodiments.

It is contemplated that the storage devices 114 store data in the form of distributed data sets, such as represented at 124 in FIG. 3. The distributed data set is divided into a number of portions 126 (e.g., blocks, stripes, etc.), with each portion 126 stored on a different storage device 114.

The example distributed data set 124 in FIG. 3 is shown to be formed of N+K portions (blocks), where N represents a number of user data blocks and K represents a number of parity data blocks, with the parity data blocks used to reconstruct up to a selected number of missing blocks.

While not limiting, in some embodiments the N+K encoding scheme of FIG. 3 corresponds to a selected RAID (redundant array of independent disks) encoding scheme, such as RAID 5, RAID 6, etc. The N+K blocks are stored to a corresponding number of storage devices SD(1) through SD(N+K), which in turn may be selected from a larger number P of storage devices where K<N<P and (N+K)<P. The storage devices SD(1) through SD(N+K) are collectively referred to as a group 128. It will be appreciated that a given storage device 114 may be a member of a number of different groups 128 depending on the arrangement of different distributed data sets across the P storage devices.

Returning to FIG. 2, the storage system 110 further includes a restoration controller 130. The restoration controller 130 may be a separate controller with a configuration similar to the various alternative configurations of the storage controller 112, or may be incorporated as a portion of the functionality of the storage controller 112.

The restoration controller 130 includes a data reconstruction module 132, a data copyback module 134 and a system transition module 136. These modules operate as explained below to perform a rebuild process upon a data set such as 124 in FIG. 3 responsive to the unavailability of at least a selected one of the storage devices 114 associated with the data set.

For purposes of the present discussion, it will be contemplated that at some point during operation of the system 110, a selected storage device, in this case storage device SD(1) in FIG. 3, experiences a device failure and is replaced by a new, replacement device. Such is merely exemplary and is not necessarily limiting.

Moreover, while not limiting, it will be contemplated for the purposes of the present discussion that each of the storage devices 114 constitute a 4 TB HDD with a maximum sustainable data transfer rate of about 140 MB/s, and that each of the devices have a utilization factor close to about 100%; that is, each storage device stores roughly about 4 TB of distributed data set data. It will be appreciated that these considerations are provided merely to enable a discussion of one exemplary environment. Other system configurations, such as different forms of storage (e.g., SSDs, etc.), different loading requirements, different capacities, etc. will provide different actual results but similar advantages.

Figure 4A:
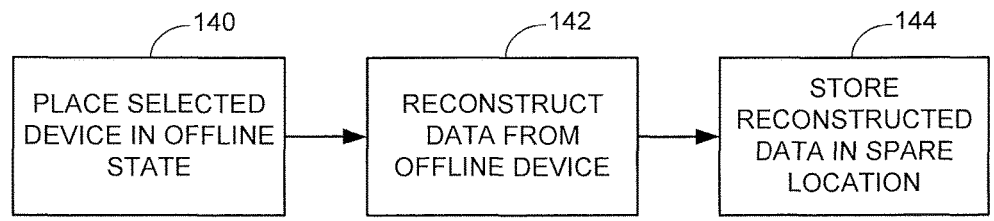
FIG. 4A is a flow diagram illustrating a data reconstruction operation carried out by the server of FIG. 2 in accordance with some embodiments.
Figure 4B:
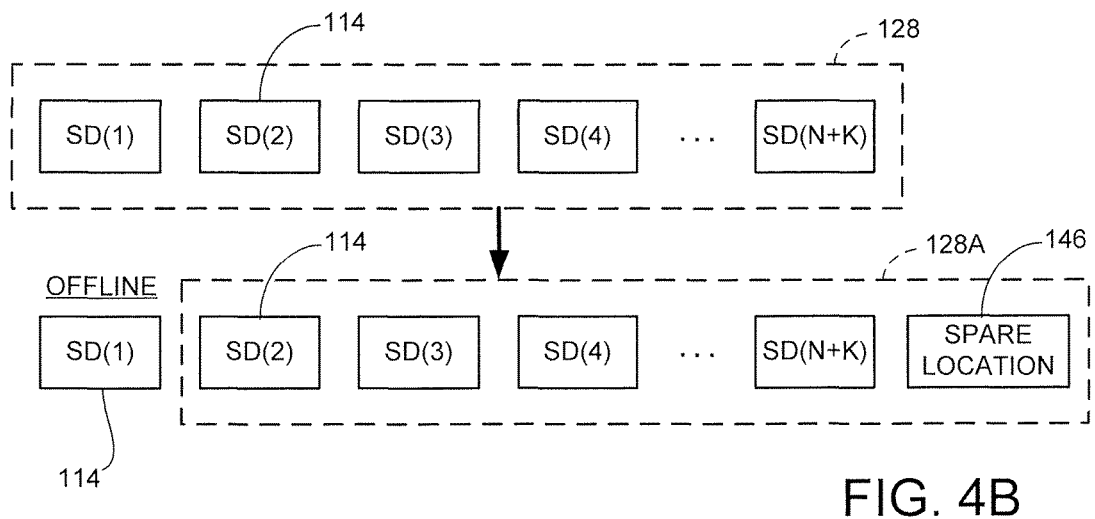
FIG. 4B is a schematic representation of the steps of FIG. 4A.

FIGS. 4A and 4B provide diagrammatic flows to illustrate steps carried out by the restoration controller 130 responsive to the detected failure of the selected device 114. As shown in FIG. 4A, the selected device (in this case, device SD(1)) is placed in an offline state at step 140. As discussed above, the term offline refers to a state whereby the device is no longer operationally connected to the remainder of the group in such a way that the device is no longer available to process host I/O requests.

In some cases, the offline device may remain in a powered state and remain mechanically connected to the system, but is not made available to process host requests. In other cases, the offline device may remain physically located in the system but be powered down to a reduced power state (or completely powered off). In still other cases, the offline device may be physically disconnected and/or removed from the storage enclosure 122.

Data previously stored on the offline SD(1) device are reconstructed at step 142. The manner in which the data are reconstructed will depend on the requirements of a given application. In some embodiments, some or all of the remaining blocks 126 on storage devices SD(2) through SD(N+K) may be retrieved in order to reconstruct the data from device SD(1). It will be appreciated that when the storage device SD(1) stores multiple blocks from different data sets, the missing portion of each data set is reconstructed in turn.

Once reconstructed, the data are stored in a suitable spare location within the system 110. In some cases, the spare location may be one or more available spare storage devices, controller memory, or existing spare storage space available for this purpose from a number of other storage devices 114 in the system. Generally, for workload and data integrity reasons the distributed storage space will not likely be placed on the other storage devices SD(2) through SD(N+ K), although such can be carried out as desired. In the present example, it is contemplated that the spare storage location is provided from available storage space from another set of storage devices similar to the storage devices in FIG. 3.

FIG. 4B is a sequence diagram illustrating the foregoing steps. The initial group 128 includes storage device SD(1). Transitioning the SD(1) device to the offline state operationally removes the device from the group 128, and the spare location associated with the reconstructed data, denoted at 146 in FIG. 4B, is temporarily incorporated into a new rebuild group 128A. The entire data set 124 is available for host access from the rebuild group 128A at this point. It will be appreciated that the various operations of FIGS. 4A and 4B are carried out under the direction of the data reconstruction module 132 of FIG. 2.

Figure 5A:
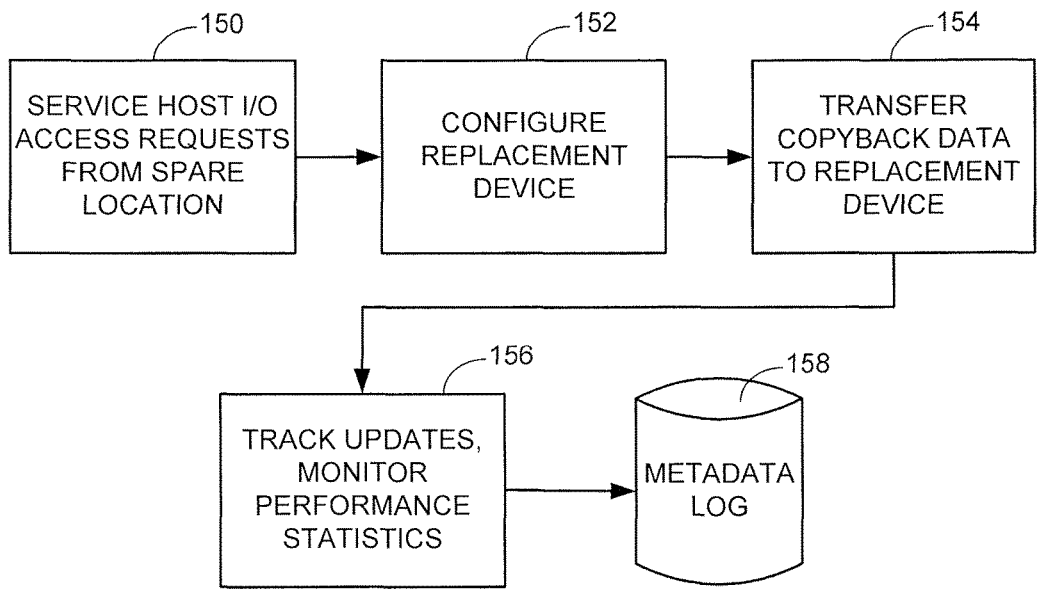
FIG. 5A is a flow diagram illustrating a data copyback operation carried out by the server of FIG. 2 in accordance with some embodiments.
Figure 5B:
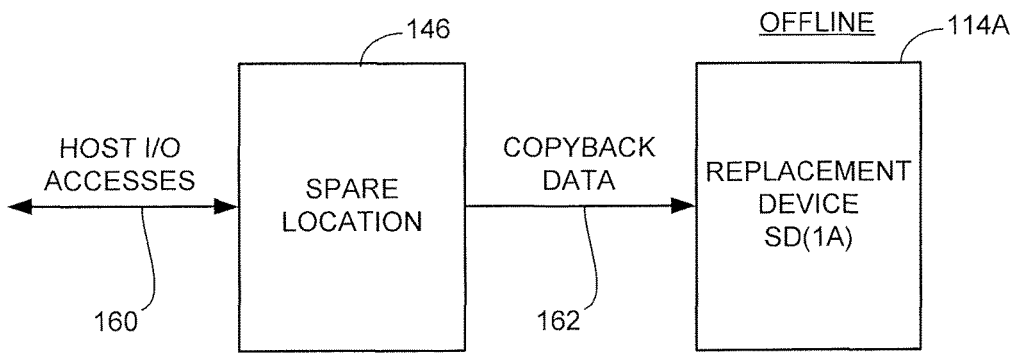
FIG. 5B is a schematic representation of the steps of FIG. 5A.

FIGS. 5A and 5B illustrate copyback processing carried out by the data copyback module 134 of FIG. 2. As shown by step 150, ongoing host I/O access requests (e.g., read and write requests) for the distributed data set 124 are serviced from the rebuild group 128A. To the extent that such requests require access to the reconstructed data, such requests are serviced directly from the spare location 146.

A new replacement storage device, denoted as 114A in FIG. 5B, is configured at step 152. The replacement storage device 114A is logically associated with the group 128A, but not yet brought online at this point. The replacement device 114A is powered up and operationally connected to the spare location 146 to handle I/O transfers therewith. While not limiting, in some embodiments the replacement device 114A may be physically inserted into the system in the location previously utilized by the failed SD(1) device 114 (see FIG. 4B). In other embodiments, the replacement device 114A is simply allocated from a pool of available devices.

Progressive (iterative) copyback processing is carried out at step 154 in which the data in the spare location 146 are transferred to the replacement device 114A. The transferred data (copyback data) may include the current version reconstructed data as well as new data supplied to the spare location by the host during the reconstruction process. The data are transferred using a separate data channel path between the spare location 146 and the replacement device 114A. Because the replacement device 114A is offline, data transfer rates can substantially match the maximum specified data rate, such as, for example, around 140 MB/s or some other value.

During the foregoing operations, the data copyback module 134 tracks updates to the data set 124 and monitors performance statistics, such as the rate at which host write updates are supplied to the data set. These and other values may be maintained in the form of a metadata log in local memory 158.

FIG. 5B shows the spare location 146 and the replacement device SD(1A) 114A. A first data channel path 160 is used to process host I/O accesses into and out of the spare location 146; for example, read requests result in readback data being supplied from the spare location along path 160, and write requests result in new updated write data being supplied to the spare location via path 160. In some cases such as RAID environments, the spare location may store other portions of the data set as well, such as parity data that can be updated and transferred to the appropriate storage devices storing the K parity data blocks.

A second data channel path 162 denotes an internal path between the spare location 146 and the SD(1A) device 114A. The copyback data substantially flows in one direction along this path 162 from the spare location to the SD(1A) device. It will be appreciated that, depending on the configuration of the system, portions of the respective paths 160, 162 may overlap. Nevertheless, these are considered separate parallel paths from an operational standpoint since the spare location is able to concurrently process the host I/O accesses and the copyback processing without each of these transfers interfering with the other.

Generally, each time that a portion of a data set transferred to the replacement device 114A is updated in the spare location, a new write operation will need to be carried out to replace the older data with the new data in the replacement device. Such updates can be noted in the metadata log (see FIG. 5A) and scheduled fur subsequent servicing.

In some cases, the copyback module 134 may monitor host access patterns and identify write priority portions that are experiencing a relatively large number of write updates. Further transfers of such portions to device SD(1A) may be suspended in favor of lower priority portions not subjected to frequent write updates.

In other cases, an elevator (or escalator) scheme can be implemented during the copyback processing transfer to device SD(1A). In such a scheme, the data copyback module 134 schedules a sequence of writes using logical addresses or other identifiers in a selected order. The module 134 can complete a "sweep" of the data transfers from a first identifier to a last identifier in such order. At the conclusion of each sweep (iteration), the module 134 can identify those identifiers that have been changed due to write updates, and perform a subsequent iteration to transfer only those identifiers that have been changed. So long as the rate at which the host(s) are providing write updates to the data is lower than the effective transfer rate to the replacement device SD(1A), the amount of data requiring transfer will necessarily eventually converge to zero.

Figure 6A:
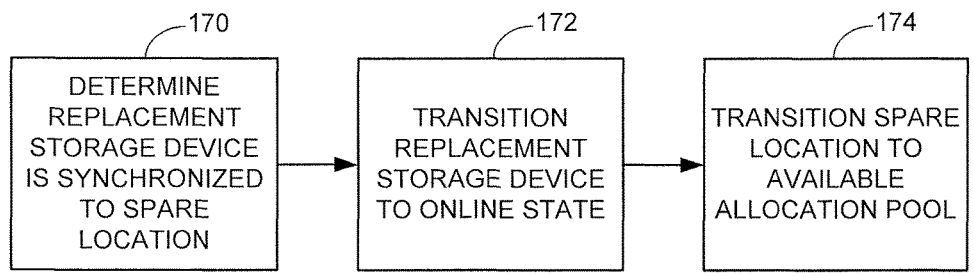
FIG. 6A is a flow diagram illustrating a system transition operation carried out by the server of FIG. 2 in accordance with some embodiments.
Figure 6B:
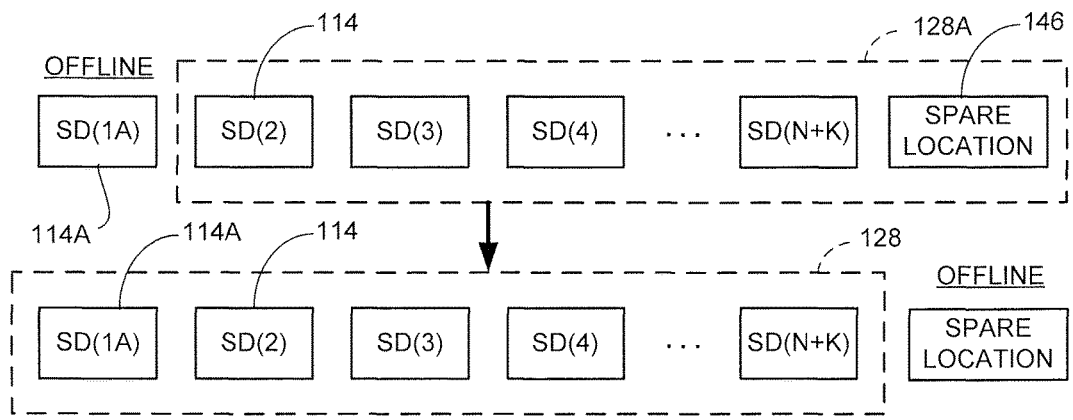
FIG. 6B is a schematic representation of the steps of FIG. 6A.

System transition to normal operation is represented by FIGS. 6A and 6B. These diagrams represent operation of the system transition module 136 in FIG. 2. As shown by step 170, a determination is made that the data stored by the replacement device SD(1A) is synchronized with the data in the spare location 146.

As used herein, the term synchronized does not necessarily require that the data stored by the replacement device is completely identical to the data in the spare location, since ongoing write updates may continue to be experienced. Rather, the synchronized state may be achieved once the level of write updates is such that all of the reconstructed data have been transferred and now the only data that needs to be transferred is a relatively low level of write updates which continue to occur based on ongoing level of host requests. In other words, synchronization can be determined to be achieved once the replacement device is configured to begin handling the subsequent host updates directly and no additional data not currently being updated needs to be transferred.

At this point, the module 136 transitions the replacement storage device 114A to an online state at step 172, thereby operationally making the storage device a part of the original group 128. This can involve a switchover within the controller 112 so that future write updates are directed to the replacement device. As shown by step 174, the spare location is no longer functioning as a surrogate member of the group and the spare location in transitioned back to an available allocation pool. These steps are illustrated in FIG. 6B.

Thereafter, the system 110 operates in a normal operational mode so that future host accesses to the distributed data set 124 are handled directly by the devices SD(1A) through SD(N+K). Once another device failure (or other form of device unavailability) arises, the foregoing sequences of steps are repeated for the affected device.

The actual time required to complete the rebalancing operation and resume normal operation can be contemplated as a classic fill-drain rate type of problem. The rate at which new write updates are supplied corresponds to the fill rate. The rate at which the reconstructed data are copied to the replacement device is the drain rate.

If the value C is defined as the device capacity in bytes, assuming 100% utilization, the system will be required to transfer C bytes of reconstructed data from the distributed spare space to the replacement device.

The value $\lambda_f$ can be used to identify the rate at which new data are being written to the spare location. The value is expressed in bytes per second (B/s) and represents the amount of new data that is being generated because of write updates (client I/O). It will be appreciated, however, that other considerations apply such as checksum data and the rate at which the distributed spare space is being written. The current example contemplates substantially random write I/O operations.

Given a throughput value TP, the amount of client (host) I/O being written to the system, a distributed spare fill rate $\lambda_F$ can be expressed as follows:

$$\lambda_F = \frac{[TP*(N+K)/N]}{P} \quad (1)$$

which is an even distribution of client data and parity data over the P available operational devices.

A next value can be defined as $\lambda_d$ which is the replacement rate, or the drain rate, in B/s of data being supplied to the replacement device. It should be noted that data are read from the spare location and written to the replacement device, so each operation consumes about $2\lambda_d$ of the available backend bandwidth for copying data during the copyback process.

From the foregoing, an estimate of the copyback period duration can be determined in accordance with the following recurrence relation:

$$D(t+1) = D(t) + \left[\lambda_f\left(1 - \frac{D(t)}{C}\right) - \lambda_d\right]dt \quad (2)$$

where D(t) represents the amount of data to be replaced at time step t in bytes, t is a time step of selected length with each step being dt in length (e.g., dt=0.5 seconds), C represents the total amount of data to transfer, $\lambda_f$ is the fill rate and $\lambda_d$ is the drain rate.

Using the recurrence equation (2), we can begin with the current amount of data that needs to be copied as left over from the previous step interval, then add in how much new data has been written by the client (host) in the current step, and then subtract how much data have been copied (drained) to the replacement device. For simplicity, it can be assumed that the client workload is uniformly random.

It will be appreciated that a write to a new area not yet transferred does not constitute new data; that is, updates to data not yet transferred do not affect the overall transfer period. On the other hand, if most of the data have been transferred, then the fill rate has a large influence on the total time required to complete the transfer.

Figure 7:
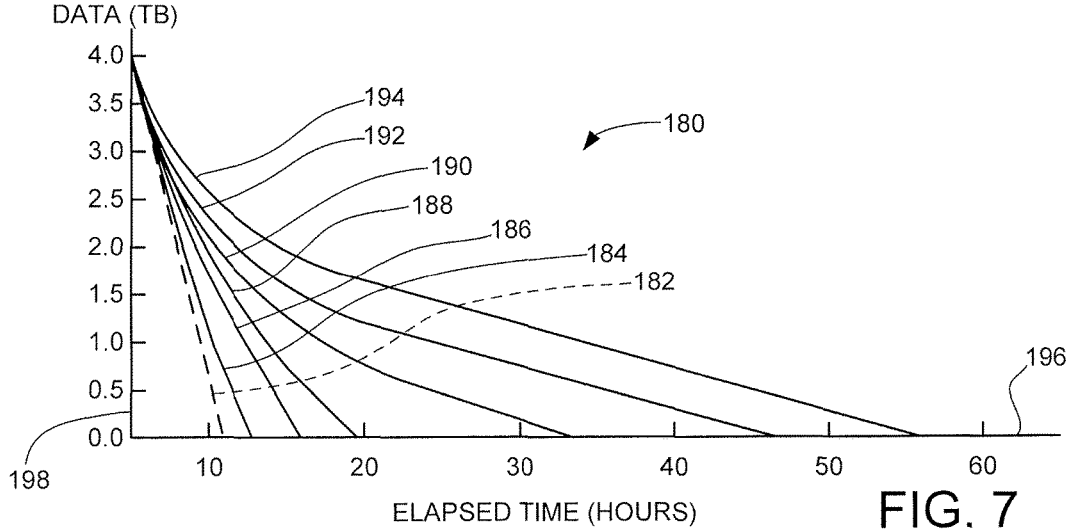
FIG. 7 is a graphical representation of various time to completion curves for the copyback processing of FIGS. 5A-5B under different host writeback levels.

Using the foregoing, it can be estimated that the rebalance completion time will correspond to the time step value that drives D(t) to zero. FIG. 7 is a graphical representation of a sequence of copyback period duration curves 180 in accordance with some embodiments for different ongoing host writeback rates.

The curves 180 are individually denoted as curves 182, 184, 186, 188, 190, 192 and 194, and are plotted against a common x-axis 196 indicating elapsed time in hours and a common y-axis 198 indicative of the remaining replacement (reconstructed) data that requires transfer to the replacement device (in terabytes, TB). It will be appreciated that once the amount of remaining data reaches essentially zero (0), the transition of FIGS. 6A and 6B occurs.

Curve 182, shown in dashed line format, represents an idealized curve showing the maximum transfer rate achievable under the current example in which the replacement device constitutes a 4 TB HDD with a maximum sustainable transfer rate of about 100 MB/s. Under the circumstances corresponding to curve 182, no write updates are received during the copyback period and the copyback transfer (see FIG. 5B) occurs in a little over 10 hours. In other words, at a sustained transfer rate of about 100 MB/s, a total of about 4 TB of data can be transferred in a little more than 10 hours.

It will be appreciated that the curves 180 assume total utilization, so that other values may be achieved under other operational conditions. Nevertheless, differences in host activity demonstrate the relative differences in the final total required copyback period, which in each case appears to be significantly less than current art solutions.

Each of the remaining curves 184-192 represent increasing amounts of writeback data updates from the host. In particular, Table 1 shows each of the curves and the associated amount of new writeback data supplied due to host I/O during the copyback process:

TABLE 1

| Curve | Average Client (Host) Write Rate |
|---|---|
| 182 | 0 |
| 184 | 780 MB/s |
| 186 | 1560 MB/S |
| 188 | 2340 MB/s |
| 190 | 3120 MB/s |
| 192 | 3744 MB/s |
| 194 | 4368 MB/s |

It will be noted that curves 192 and 194 provide fill rates that exceed the drain rate; in such cases, the system switches to duplicative writes so that new writes are supplied to both the replacement device and the spare location concurrently. Nevertheless, even under these circumstances the copyback period is significantly reduced by a factor of at around 2× (e.g., about 45-55 hours compared to 116 hours). In the best case scenario, the total copyback period is decreased by more than about 8× (e.g., a little over 10 hours to complete).

Even with a relatively large amount of write updates to a given reconstructed data set (or group of reconstructed data sets), it can be seen from FIG. 7 that enactment of a replacement device can be carried out efficiently in such a way that the actual host I/O rate, which is paramount, remains substantially unaffected by the device failure.

In some embodiments, the data remaining to be copied to the replacement device can be tracked using a bit array data structure in the metadata log. Each bit in the array can correspond to one unit of data, so that a first logical value (e.g., 0) indicates the data have been copied and a second logical value (e.g., 1) indicates that the data have not been copied or have been updated. The rebalance algorithm iterates over the bit array in an unbounded number of passes, copying data as required. Once the bit array is cleared, the rebalancing is completed and the replacement device can be transitioned to online status. As noted above, however, the final few copy operations may need to be carried out in parallel in anticipation of the transition.

It will be noted that the standard approach set forth above will converge to zero so long as the fill rate is less than the drain rate. Since the drain rate is substantially constant, it is only required to consider issues relating to the fill rate, which may be dynamic. Fill rate can be assessed by accumulating bit array changes over time so that overwritten new data units are not counted twice.

Clearly, at the beginning of the copyback process the entire contents of the reconstructed data in the spare location need to be copied to the replacement device, and the effective fill rate will be low since, to the extent that write updates occur, such will affect data that have not yet been copied. As the system progresses and the effective fill rate increases, the system can operate in a number of alternative ways.

In some cases, the system can switch to standard duplicative write replacement as noted above, so that new client data units are written both to the spare location and to the replacement device simultaneously. In other cases, the ongoing host (client) I/O rate can be artificially delayed to bring the fill rate below the drain rate. In some cases, end user (customer) desires to accelerate the completion of the copyback operation may allow a throttling of the input host I/O rate. A combination of these approaches can be used. It will be appreciated that these and other techniques can be implemented as part of the transition of the replacement device to the online state as discussed above.

In some cases, new data tracking information (e.g., the metadata logs of FIG. 5A) can be saved in non-volatile (persistent) storage similar to how writes are tracked with existing metadata write intent bitmap or other structures. As noted above, since the copyback operation is carried out offline, power cycles or other service interruptions do not affect the system integrity, allowing the system flexibility in completing the copyback process in view of existing host loading requirements.

Figure 8:
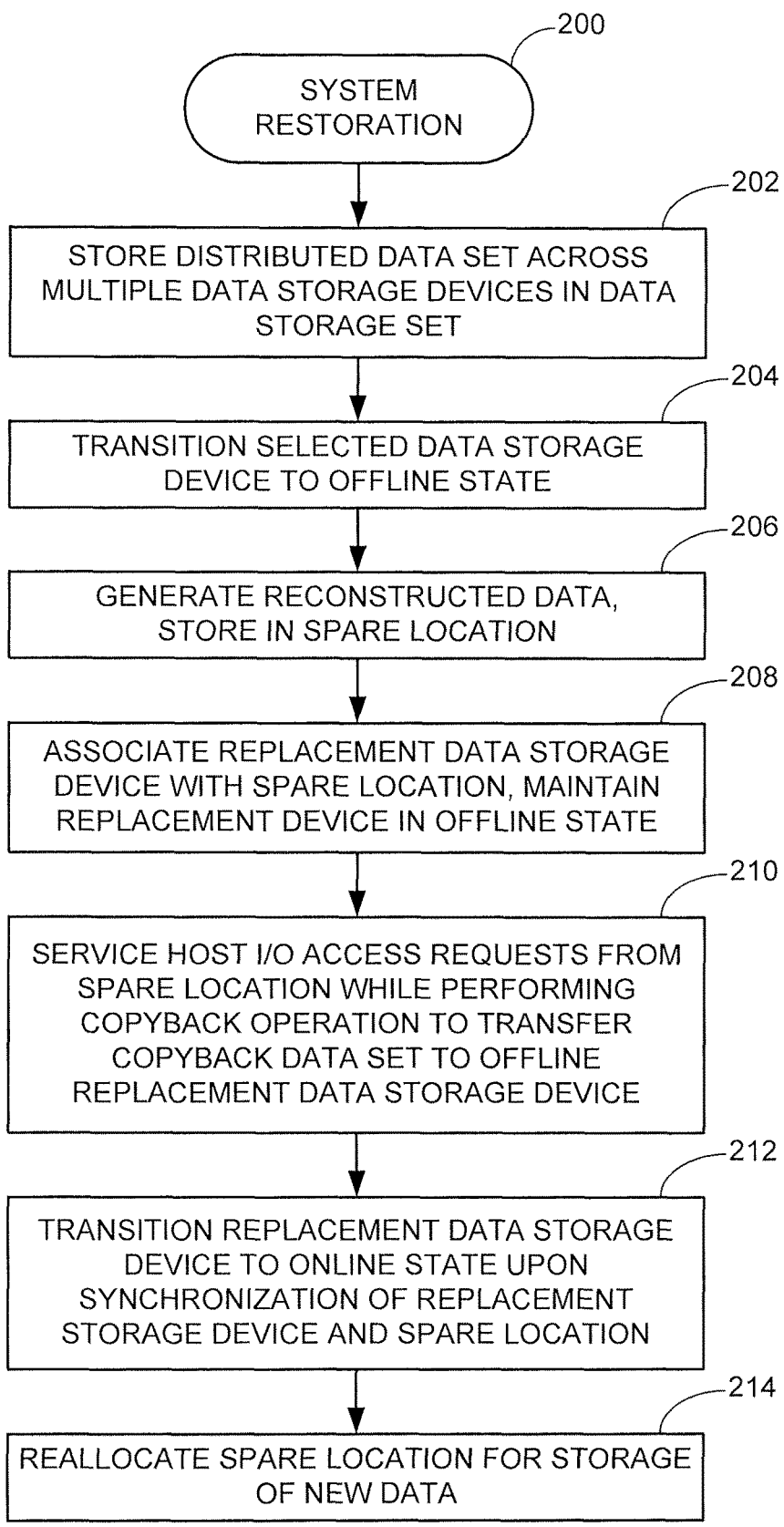
FIG. 8 is a flow chart for a system restoration curve illustrative of steps carried out in accordance with some embodiments.

FIG. 8 is a system restoration routine 200 illustrative of steps carried out in accordance with the foregoing discussion. It will be appreciated that the various steps shown in FIG. 8 are merely exemplary and such steps can be omitted, augmented, modified and/or performed in a different order depending on the requirements of a given application.

As shown by step 202, a distributed data set, such as the exemplary data set 124, is stored across a group of data storage devices in a multi-device storage system such as 110. At some point during such operation, a selected one of the storage devices is transitioned to an offline state, as indicated by step 204. It will be appreciated that the present embodiments can process the concurrent unavailability of multiple storage devices from the group, but only one device is discussed for purposes of simplicity of illustration.

Moreover, while there are myriad reasons why a particular device may be transitioned to an offline condition, including interconnection problems (either inadvertent or intentional), scheduled maintenance, device failure (either the storage device itself or an associated component), software conflicts, etc., for purposes of the present discussion it is contemplated that the issue relates to a failure of the storage device itself. Similar steps are carried out under these other circumstances.

As shown by step 206, a reconstructed data set is generated in response to the transition of the selected device to the offline condition, and the reconstructed data set is stored in a suitable spare location.

In the case of a failed device, a replacement storage device is identified and logically associated with the group of storage devices at step 208. The replacement device is operationally coupled to the spare location but otherwise remains in an offline state with respect to the storage device group, and is therefore not in a position to assist in the processing of ongoing host I/O requests.

At step 210, ongoing host I/O requests are processed using the reconstructed data in the spare location, with such I/O requests bypassing the replacement storage device. During such operation, copyback transfers are enacted to transfer the reconstructed data set to the replacement storage device.

Upon synchronization of the replacement storage device with the spare location, as shown by step 212, the replacement storage device is transitioned to an online condition. At this point, future host I/O requests are processed directly by the replacement storage device instead of by the spare location. The spare location is returned to the spare allocation pool and the system resumes normal operation at step 214.

It will now be appreciated that the various embodiments disclosed herein can provide a number of benefits. Using a spare location as the operational location for the reconstructed data provides ongoing host I/O access support at substantially the same rate as during normal operation. Maintaining the new replacement device in an offline state enables maximum data transfer, thereby reducing the copyback period as well as reducing the metadata control complexity since the replacement device is not required to assist in servicing host I/O requests.

Even in a write dominant environment where various data sets undergo significant write updates, so long as the rate at which the write updates is less than the maximum transfer rate of the replacement device, eventually the replacement device will be synchronized to the spare location and transition can occur. Because such transition does not have any particular effect on host activity from a host standpoint, the actual transition can be scheduled at a suitable time, such as a reduced workload period (e.g., off hours).

Indeed, since the copyback process does not impact host I/O access rates as such are carried out along different data paths, the pressure to complete the copyback process is reduced, further enabling the system to operate efficiently and with fewer errors. Accordingly, a more orderly transition back to normal operation can be performed.

Embodiments of the present disclosure have been described with particular reference to the examples illustrated. While specific examples are shown in the drawings and are herein described in detail, it should be understood, however, that the drawings and detailed description are not intended to limit the disclosure to the particular form disclosed. It will be appreciated that variations and modifications may be made to the examples described within the scope of the present disclosure.

What is claimed is:
1. A method comprising:
    storing a distributed data set across a group of storage devices;

reconstructing data from a selected storage device in the group and storing the data in a spare location;

servicing host access requests associated with the data from the spare location along a first data path and concurrently transferring the data from the spare location along a different, second data path to a replacement storage device maintained in an offline condition using a progressive copyback process; and transitioning the replacement storage device to an online condition responsive to the transfer of the data to the replacement storage device.

2. The method of claim 1, wherein the reconstructing data step is carried out responsive to the selected data storage device being placed in an offline condition.

3. The method of claim 2, wherein the selected data storage device is placed in an offline condition responsive to detection of a failure condition associated with the selected data storage device, and wherein the replacement data storage device is incorporated into the group of storage devices in lieu of the selected data storage device.

4. The method of claim 1, wherein the spare location is a distributed storage space formed from a portion of each of a plurality of an additional group of data storage devices.

5. The method of claim 1, wherein the servicing of the host requests comprises receiving write updates that modify the reconstructed data in the spare location, and wherein the write updates are subsequently transferred to the replacement storage device.

6. The method of claim 1, wherein the replacement storage device has a maximum sustainable data transfer rate, and wherein the data are transferred from the spare location to the replacement storage device over the second data path at a data transfer rate substantially equal to the maximum sustainable data transfer rate.

7. The method of claim 1, further comprising generating a metadata log having a bit array of bits, with at least one bit corresponding to a status of each of a plurality of units of the data in the spare location, and wherein the progressive copyback process uses an elevator scheme over multiple iterations to transfer the units of the data to the replacement storage device responsive to bit values of the bit array.

8. The method of claim 1, further comprising reducing the rate of host access requests by the spare location to maintain a fill rate of write updates to the spare location below a drain rate at which the data are transferred to the replacement device.

9. The method of claim 1, wherein at least a selected one of the selected storage device and the replacement storage device is characterized as a hard disc drive (HDD).

10. The method of claim 1, wherein at least a selected one of the selected storage device and the replacement storage device is characterized as a solid-state drive (SSD).

11. The method of claim 1, wherein the distributed data set is characterized as a RAID (redundant array of independent disks) data set of N+K blocks where N is a plural number of data stripes of user data and K is a number of parity stripes, each of the N+K blocks stored in a different one of the group of storage devices.

12. A method comprising:

transitioning a selected data storage device from a plurality of data storage devices that collectively store a RAID data set to an offline condition responsive to a failure condition associate with the selected data storage device;

reconstructing data previously stored on the selected data storage device and storing the data in a spare memory location;

incorporating a replacement data storage device into the plurality of data storage devices in substitution for the selected storage device, the replacement data storage device placed in the offline condition;

servicing host access requests associated with the RAID data set using the data in the spare memory location along a first data path and concurrently transferring the data along a different second data path to the replacement data storage device in the offline condition using a progressive copyback process;

transitioning the replacement data storage device from the offline condition to an online condition responsive to the replacement data storage device receiving a complete set of the data transferred from the spare memory location; and servicing host access requests associated with the RAID data set using the data stored by the replacement data storage device.

13. The method of claim 12, wherein the first and second data paths are separate, parallel data paths such that the host access requests bypass the replacement data storage device during such time that the replacement data storage device is in the offline condition.

14. The method of claim 12, wherein each of the plurality of data storage devices and the replacement data storage device is characterized as a hard disc drive (HDD), and the reconstructed data set is transferred to the replacement data storage device at a sustained rate of at least about 100 MB/s.

15. An apparatus comprising:

a group of storage devices which store a distributed data set thereacross; and a restoration control circuit adapted to, responsive to detection of a failure condition associated with a selected storage device from the group of storage devices, place the selected storage device in an offline condition, reconstruct the data from the selected storage device and store the data in a spare location, service host access requests associated with the data from the spare location along a first data path while concurrently transferring the data from the spare location along a different, second data path to a replacement storage device maintained in an offline condition using a progressive copyback process, and transition the replacement storage device to an online condition responsive to the transfer of the data to the replacement storage device.

16. The apparatus of claim 15, wherein the distributed data set is characterized as a RAID (redundant array of independent disks) data set of N+K blocks where N is a plural number of data stripes of user data and K is a number of parity stripes, each of the N+K blocks stored in a different one of the group of storage devices.

17. The apparatus of claim 15, wherein the spare location is a distributed storage space formed from a portion of each of a plurality of an additional group of data storage devices.

18. The apparatus of claim 15, wherein the host access requests comprise write updates that modify the reconstructed data in the spare location, and wherein the restoration control circuit subsequently directs a transfer of the write updates to the replacement storage device.

19. The apparatus of claim 15, wherein the restoration control circuit transitions the replacement device to the online condition responsive to a rate at which write updates are received by the spare location falling below a selected threshold.

20. The apparatus of claim 15, wherein the replacement storage device has a maximum sustainable data transfer rate, and wherein the data are transferred from the spare location to the replacement storage device over the second data path at a data transfer rate substantially equal to the maximum sustainable data transfer rate.

* * * * *